Patented Aug. 6, 1940

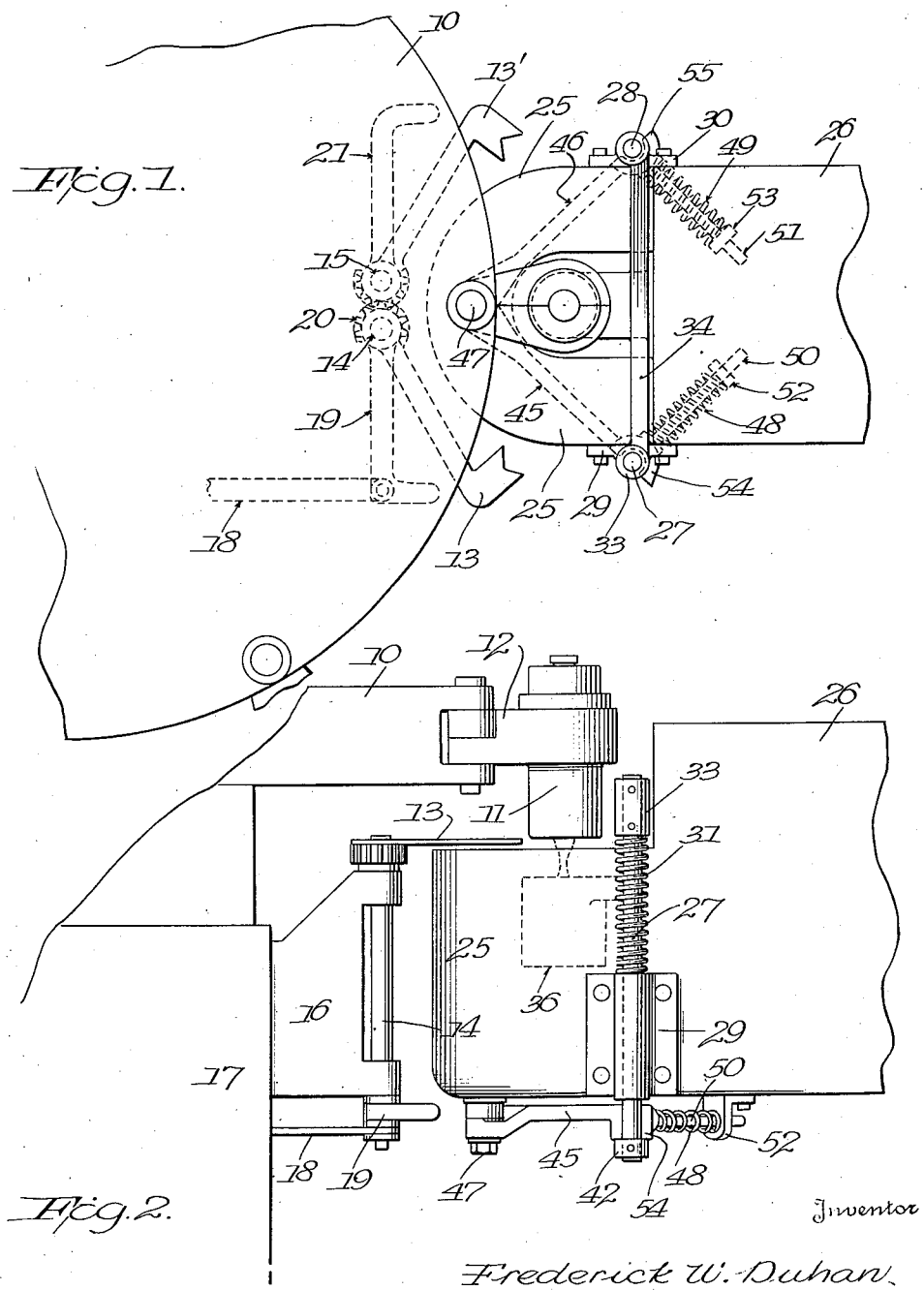

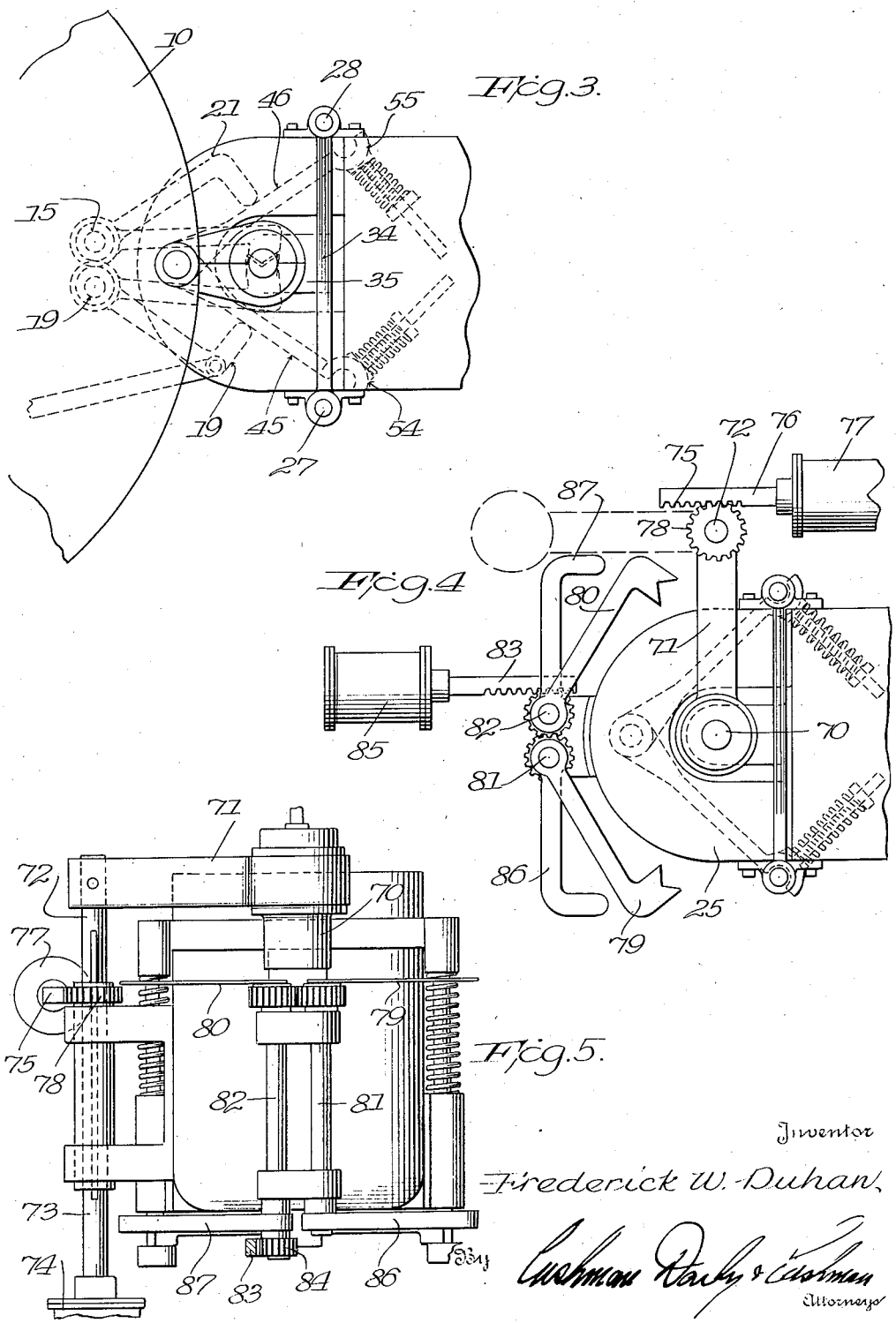

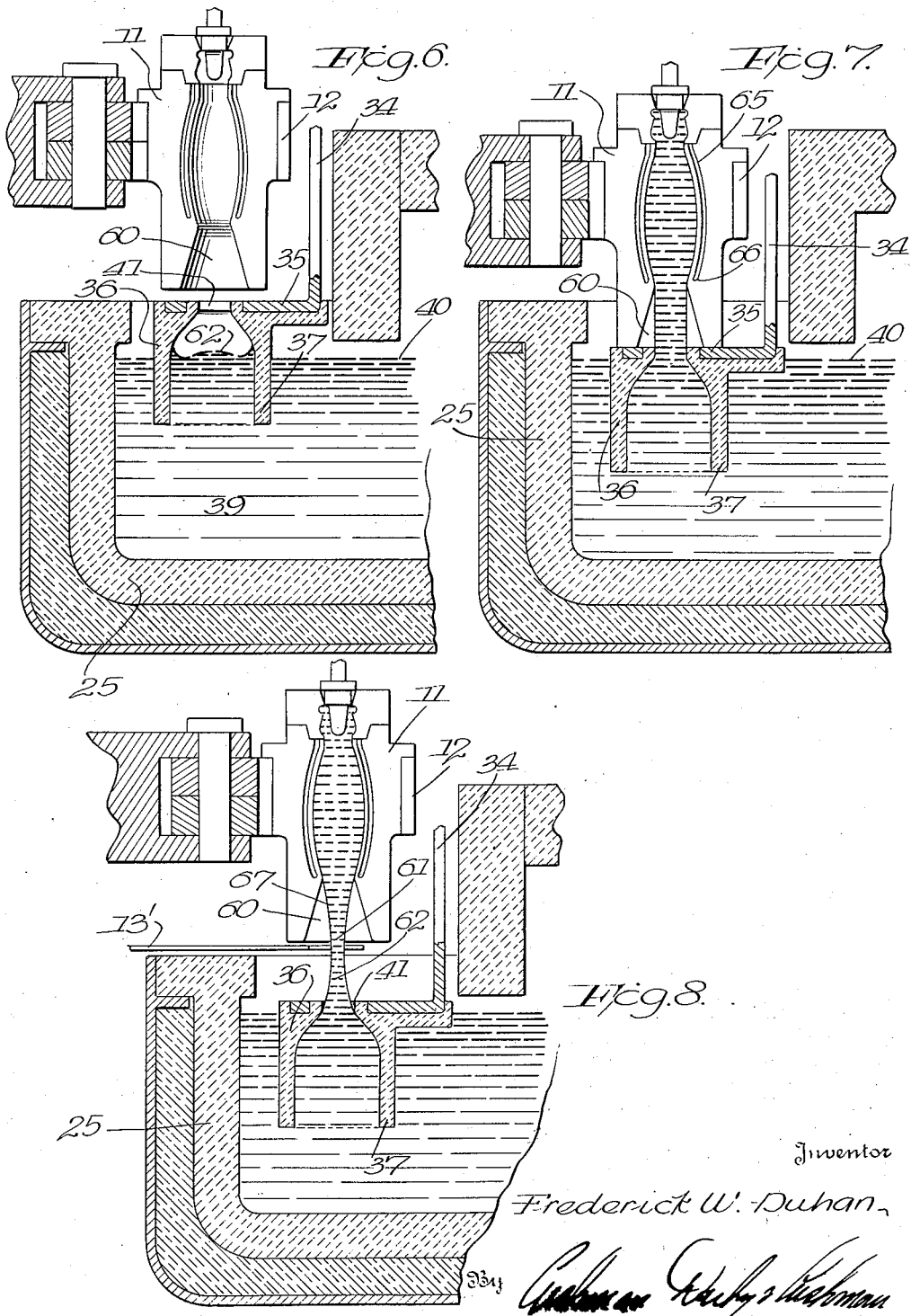

2,210,203

UNITED STATES PATENT OFFICE 2,210,203

METHOD OF AND APPARATUS FOR FILLING SUCTION MOLDS

Frederick William Duhan, Baltimore, Md., assignor to Crown Cork & Seal Company, Inc., Baltimore, Md., a corporation of New York Application August 2, 1938, Serial No. 222,699

20 Claims. (Cl. 49—5)

This invention relates to a method of and apparatus for delivering molten glass to a suction gathering mold.

It is a primary object of the invention to provide means for delivering glass from a supply pool to a gathering mold, without dipping the mold into the glass. In conventional gathering and forming machines, the gathering mold or the parison mold is dipped into a supply pool, either in the forehearth or in a rotating pot containing the molten glass or the like. A number of disadvantages inevitably result from dipping a mold into the surface of a body of molten glass. The mold is unduly heated by contact with a large body of glass and the corrosive action on the bottom of the mold is deleterious. Moreover, the mold tends to chill the glass in the supply pool, with the result that the chilled glass must be removed from the gathering area before the next charge is picked up. Thus, expensive and complicated machines have been necessary to circulate the glass in the forehearth, to remove the chilled bodies of glass, or rotating pots have been found necessary, so that a charge is gathered from a different point in the pool upon each operation of the machine.

According to the present invention, the mold is not dipped into the surface of the pool. On the contrary, the glass is fed upwardly through a delivery conduit member having an upwardly facing delivery orifice spaced above the surface of the pool and held in contact with the filling opening of the mold during the charging operation.

It is a further object of the invention to provide means for reheating the stub of glass left after a shearing operation and to reheat and obliterate the relatively cold scar or shear mark left by the shears. To this end, the invention includes means for retracting and withdrawing the sheared stub from a position above the adjacent delivery orifice, into the interior of the conduit member where it is reheated by contact with the main body of glass in the member, in communication with the glass in the pools.

It is a further object of the invention to provide means for causing the delivery member to be maintained in substantially air-tight relation to the gathering mold during the filling operation and during a downward movement of the mold toward the surface of the glass in the pool.

It is a further object to provide means for holding the delivery member in the lowered position during an upward movement of the gathering mold, to attenuate the body of glass connecting the delivery orifice and the filling opening of the mold, thereby to facilitate shearing.

It is a further object to provide means for raising the delivery member immediately after the completion of the shearing operation, thereby to retract the sheared stub to a position below the orifice, within the member, to effect a reheating of the same.

Other and further objects of the invention will be apparent to one skilled in the art, from a consideration of the following description and the accompanying drawings.

In the drawings:

Figure 1 is a plan view of the apparatus of the present invention, shown in combination with the parison mold holding table of a rotary glassware forming machine.

Figure 2 is a side elevation of the apparatus of Figure 1.

Figure 3 is a fragmentary view similar to Figure 1, showing the parts in a different position.

Figure 4 is a top plan view of a modified form of apparatus shown in combination with a suction gathering feeder.

Figure 5 is an end elevation of the apparatus of Figure 4, and

Figures 6, 7 and 8 are, respectively, enlarged vertical sectional views of the apparatus of Figure 1, showing successive steps in the method of charging a suction gathering mold.

In Figures 1, 2 and 3, a parison mold table is represented diagrammatically at 10. For purposes of illustration, the table may be considered to be the intermittently rotatable parison mold table of the well known Roirant bottle forming machine, the general arrangement of which is shown in Patent 2,021,670, Emile Roirant, November 19, 1935. The table of that machine rotates step by step to bring parison molds successively to a gathering position above a forehearth, rotating pot, or the like. Each time that the table comes to rest in that position, the entire table and the parison molds carried thereby are lowered, by the operation of a rotating cam associated with the machine, but not shown in the accompanying drawings. When the table drops in this manner, the parison mold is lowered to a gathering position. As soon as the mold has been filled, the table is raised and rotated to the next position, where the cycle of operation is repeated.

In the accompanying drawings, a parison mold 11 is shown diagrammatically mounted in mold holders 12 pivoted to the table 10. A pair of shear blades 13, 13' are mounted on the upper ends of spindles 14, 15 journaled in a bracket 16 carried by the stationary base 17 of the machine. The shears are operated in predetermined timed relation to the upward movement of the parison mold 11 by a link 18 connected to the driving means of the machine, in a well known manner. The link is attached to an arm 19, fast on the lower end of the spindle 14. A pair of meshing pinions 20 at the upper ends of the spindles impart uniform movement to the shears 13, 13' to sever the tail of glass between the filling opening of the mold and the parent body of glass in the pool. The vertical spindle 15 also carries, at its lower end, a laterally projecting arm 21, similar to the arm 19, for purposes hereinafter described.

The forming machine shown diagrammatically in the accompanying drawings is disposed in operative, charging relation to a forehearth 25 projecting outwardly from an extension 26 on a conventional glass melting furnace. On opposite sides of the forehearth, a pair of vertically disposed rods 27, 28 are slidably mounted for vertical reciprocation in brackets 29, 30. Coil springs 31, 32, disposed between the bracket 29 and collars 33 on the ends of the rods, constantly urge the rods in an upward direction.

Attached to the collars 33, or integral therewith, is a transverse bracket 34 having a forward extension 35 (Figs. 6-8), to which is attached a refractory conduit member or delivery cup 36. The lower ends 37 of the walls of the cup are immersed in the glass 39 below the surface 40 thereof. The cup is provided with an upwardly facing discharge orifice 41, which is preferably of reduced diameter.

Since the delivery member 36 and the bracket 34 are supported from the upper ends of the rods 27, 28, they are free to move vertically with respect to the molten glass in the forehearth. The lower ends of the rods 27, 28 carry collars 42, to limit the upward movement of the rods and the delivery cup 36. Means are provided for maintaining the cup and the supporting rods in the lowered position, shown in Figures 2, 7 and 8. A pair of rearwardly projecting arms 45, 46 are pivoted to a downwardly projecting stud 47 on the bottom of the forehearth casing. The free ends of the arms 45, 46 are urged outwardly by springs 48, 49 surrounding guide rods 50, 51 and compressed between the ends of the rods and angle brackets 52, 53 bolted to the undersurface of the bottom of the forehearth casing.

The free ends of the arms 45, 46 are formed into semi-cylindrical, half-sleeve sections 54, 55, shaped to closely embrace the cylindrical surface of the associated rods, but of too small a diameter to receive the collars 42 fixed on the lower ends of the rods.

When the rods 27, 28 have been lowered to the position shown in Figure 2, by means hereinafter described, the springs 48 urge the sleeve portions 54, 55 outwardly to fit closely around the rods. Upward force imparted to the rods by the springs 31, 32, is therefore restrained and the rods are held in the lowered position, by the abutment of the collars 42 with the lower faces of the ends 54, 55 of the arms 45, 46. Thus the delivery member 36 is held in the lowered position, until the arms 45, 46 are moved inwardly, to disengage the ends 54, 55 thereof from above the collars 42, whereupon the cup is raised by the coil compression springs 31, 32.

The arms 19 and 21 fixed to the shear spindles 14, 15 comprise means for imparting inward pivoting movement to the latch arms 45, 46. The arms 19 and 21 are so angularly arranged with respect to the shear blades 13, 14, that they will engage the arms 45, 46 at the completion of the shearing action of the blades. Therefore, when the shear cut has been made, the latching means for the delivery cup will be released, to permit the cup to rise to its original position. As a consequence, the movements of the cup are controlled by the shear action.

As shown in Figure 6, the delivery member 36 is in its upper position. The parison mold 11 is in position to commence its downward movement to gathering position. It lies directly above the delivery member 36 and, when it moves downwardly, the filling opening 60 registers with the delivery opening 41. As the mold continues its downward movement, it pushes the cup 36 downwardly to substantially the position shown in Figure 7, with the discharge orifice substantially level with the surface of the molten glass in the pool. Simultaneously, vacuum is applied to the mold to fill the interior thereof by suction. When in the lowered position of Figure 7, the latch arms 45, 46 are then operative to hold the delivery member 36 in that position. As soon as the mold has become filled, it is raised to the position shown in Figure 8, thereby attenuating the connecting body of glass 61 between the mold and the delivery member. The shear blades 13 are then actuated to cut the attenuated body of glass, preferably as near the bottom of the mold as possible. The cup 36 is released from the lowered position by the shear action and immediately is drawn upwardly by the springs 31, 32. This upward movement serves to withdraw the stub or neck of glass 62 above and in the delivery orifice 41, to a position within the delivery cup, where it is reheated by the large body of glass therein and by heat absorbed from the walls of the refractory cup.

On the next downward movement of the cup, the reheated glass is forced upwardly by the combined action of the downward movement of the cup and suction applied through the mold, and the cycle is repeated.

The parison mold shown in Figures 6, 7 and 8 is of novel construction. Preferably, the suction grooves 65 formed in the meeting faces of the mold halves are in communication with suction passages in the neck ring and extend downwardly only to a point 66, adjacent a restricted portion of the mold. As a result, the glass will completely fill only the upper portion of the mold and neck ring, leaving a tapering tail 67 when the mold is raised (Fig. 8). This tail portion is preferably first shaped by a special bottom forming member, to provide a parison having a well-shaped lower end. Then, when the parison is blown, the lower end is expanded to substantially fill the downwardly and outwardly flaring lower end of the parison mold, to provide a uniform lower end for the bottle when blown to final form in the blow molds.

In Figures 4 and 5, a slightly modified form of apparatus is shown, wherein a suction gathering mold 70 is supported at the outer end of a swinging arm 71, secured to the upper end of an oscillating and reciprocating spindle 72. The spindle 72 is reciprocated vertically by a piston rod 73, connected to the piston in the cylinder 74 of a vertically disposed air motor. The spindle 72 is oscillated by a rack 75 on the piston rod 76 of a horizontally disposed air motor 77. The rack 75 meshes with a pinion 78 splined on the spindle 72, but restrained against vertical movement. Horizontal swinging movements and vertical reciprocations are imparted to the arm 71 and the mold 70 by the delivery of compressed air to opposite ends of the cylinders 77 and 74, as controlled by a conventional air timer.

Shear blades 79, 80 are carried at the upper ends of spindles 81, 82, geared together. The spindles are oscillated by a rack 83 meshing with a pinion 84 and reciprocated by an air motor 85. The lower ends of the vertical spindles 81, 82 carry laterally projecting arms 86, 87, which correspond to the arms 19, 21 associated with the shear mechanism in the first form of apparatus.

The delivery conduit member and its associated parts, associated with the forehearth 25, may be similar or identical to the corresponding parts previously described.

In both forms of the apparatus, the compression coil springs surrounding the rods 27, 28 perform a dual function, in that they serve to raise the delivery conduit member from the lower to the upper position and, secondly, during the downward movement of the gathering mold, they maintain the delivery cup in substantially airtight relation with the lower end of the mold because of the upward force applied to the mold. When the delivery apparatus of the present invention is used with a forming machine of the type shown diagrammatically in Figures 1, 2 and 3, the delivery conduit member 36 is forced downwardly by the weight of the parison mold table and the force of the compression springs is overcome thereby when the table drops. In such a forming machine, for instance, of the type shown in the patent to Roirant, 2,021,670, November 19, 1935, the entire parison mold table is lowered and raised by a large, continuously rotating cam disc having a vertically disposed cam track supporting the central column for the table and timed to lower and raise the table during the periods of rest thereof. Since the details of construction of the forming machine are not part of the present invention they are not described herein. When used with a glass feeder of the suction gathering type, as shown in Figures 4 and 5, the force of the compression springs is overcome by air delivered to the upper end of the vertical cylinder 74. In both cases, the mold is maintained in substantially air-tight relation to the delivery member.

The retraction of the sheared stub to a position within the cup, as represented in Figure 6, is facilitated by the inherent viscosity and adhesive characteristic of the molten glass. As the cup is raised from the position shown in Figure 8 to that of Figure 6, the marginal portions of the glass within the cup will tend to rise with the cup, because of the adhesive contact with the walls of the cup. As a result, the central portion of the glass in the cup and in the orifice will be drawn relatively downwardly, thereby increasing the retractive effect on the stub. Likewise, when the cup descends under the influence of downward force applied thereto by the mold, the marginal portions of the glass within the cup will tend to move downwardly with the walls of the cup. As a result, hot glass in the center of the cylindrical body of glass within the cup will be forced upwardly by a sort of pumping action and hot fresh glass will break through the surface of the glass within the cup and be delivered to the mold. Consequently, the mold is always charged with fresh hot glass.

It must be understood that the present invention is not limited to the details of construction shown in the accompanying drawings and described above, nor to the particular method steps enumerated, but covers all devices and methods coming within the scope of the appended claims and their equivalents.

I claim:

1. The method of charging a suction gathering mold with molten glass from a supply pool without dipping the mold into the surface of the pool, which comprises registering the lower charging end of the mold with an upwardly facing discharge orifice at the upper end of a molten glass confining and conducting member having its lower end immersed in the glass in the pool, lowering the mold and member together, applying suction to the upper end of the mold, thereby filling the member and mold with a connected body of glass, separating the mold and member and thereby attenuating the body of glass connecting the two, severing the attenuated body, and thereafter raising the member relative to the pool and thereby retracting the glass between the orifice and the plane of severance to a position within said member.

2. The method of charging a suction gathering mold with molten glass from a supply pool without dipping the mold into the glass, which comprises registering the lower charging end of the mold with an upwardly facing discharge orifice at the upper end of a molten glass confining and conducting member having its lower end immersed in the glass in the pool, lowering the mold and member together, applying suction to the upper end of the mold, thereby filling the member and mold with a connected body of glass, raising the mold while maintaining the member substantially stationary and thereby attenuating the glass connecting the two, severing the attenuated glass, and thereafter raising the member, thereby retracting the glass between the orifice and the plane of severing to a position within said member.

3. The method of charging a suction gathering mold with molten glass from a supply pool without dipping the mold into the glass, which comprises registering the lower charging end of the mold with an upwardly facing discharge orifice at the upper end of a molten glass confining and conducting member having its lower end immersed in the glass in the pool, lowering the mold and member together, and simultaneously applying suction to the upper end of the mold, thereby filling the member and mold with a connected body of glass, raising the mold while maintaining the member substantially stationary and thereby attenuating the glass connecting the two, severing the attenuated glass, and thereafter raising the member and thereby retracting the glass between the orifice and the plane of severing to a position within said member.

4. The method of charging a gathering mold with molten glass from a supply pool without dipping the mold into the glass, which comprises laterally confining a portion of the glass in the pool on and below the surface thereof within a member having an upwardly facing delivery orifice, registering the gathering opening of the mold with the glass within the delivery orifice without dipping the mold into the glass, forcing the confined body of glass upwardly through the orifice and the gathering opening into the mold, separating the mold from the orifice and thereby attenuating the glass connected between the orifice and the gathering opening, severing the attenuated glass, then raising the member and the delivery orifice relative to the stub of glass left in and above the orifice after severance, and reheating the severed stub within the member.

5. The method of charging with molten glass, a mold having a suction gathering opening, from a supply pool without dipping the mold into the surface of the pool, which comprises positioning in the pool a delivery member having an upwardly facing discharge orifice spaced above the surface of the pool, registering the gathering opening of the mold with said orifice, lowering the mold and the member to position the orifice substantially flush with the surface of the glass, applying a suction to the interior of the mold to draw molten glass upwardly through the orifice and the opening to fill the mold with a body of glass connected to the glass in the member, raising the mold while maintaining the member in the lowered position, thereby to attenuate the body of glass connecting the mold and member, severing the attenuated body of glass, and then raising the member to its initial position with the orifice above the surface of the pool of glass, thereby retracting the sheared body of glass in the orifice downwardly into the interior of said member to reheat the same.

6. The method of charging a suction gathering mold with molten glass from a supply pool without dipping the mold into the surface of the pool, which comprises providing a delivery member having an upwardly facing orifice positioned above the surface of the glass and downwardly projecting walls immersed in the glass, registering the gathering opening of the mold with said orifice and filling the mold by suction, separating the mold and member to attenuate the body of glass connecting the orifice and the opening, severing the attenuated body of glass, and retracting the severed stub in and above the orifice to a position within the member below the orifice to reheat the same by positively raising the member relative to its position at the time of severing.

7. The method of charging a suction gathering mold with molten glass from a supply pool without dipping the mold into the surface of the pool, which comprises providing a delivery member having an upwardly facing orifice positioned above the surface of the glass and downwardly projecting walls immersed in the glass, registering the gathering opening of the mold with said orifice and filling the mold by suction, separating the mold and member to attenuate the body of glass connecting the orifice and the opening, severing the attenuated body of glass, and, immediately after severing, moving the member to cause the severed stub of glass in and above the orifice to move from the orifice into the pool of glass within the member to be reheated.

8. The method of charging a suction gathering mold mounted for vertical movement toward and from the surface of a supply pool and for lateral movement toward and from a gathering position over the pool, which comprises providing a vertically movable delivery member having a delivery orifice normally positioned above and spaced from the surface of the pool and walls projecting downwardly and immersed in the pool, registering the gathering opening of the mold with said orifice, lowering the mold and thereby imparting lowering movement to the member, applying suction to the mold to draw glass upwardly through the orifice and the opening to fill the latter with a body of glass connecting the member and mold, holding the member in the lowered position and raising the mold, thereby to attenuate the connecting body of glass, shearing the attenuated body and utilizing the shearing action to release the member from its lowered position, and then raising the member and the walls of the orifice to the initial position above the surface of the pool, thereby to enclose the sheared stub formed in the orifice within the member below the orifice.

9. The combination with a machine for gathering charges of glass by suction including an open bottom suction mold mounted for vertical movement toward and from the surface of a supply pool of molten glass, of a delivery member in the molten glass having an upwardly facing orifice positioned to register with the open bottom of the mold in charging relation therewith, said member being mounted to move downwardly with the downward movement of the mold to facilitate charging of the mold, means for holding the member at the lowered position during upward movement of the filled mold, thereby to stretch and to attenuate the connecting neck of glass between the mold and said orifice, means for severing the attenuated neck, and means operative in predetermined timed relation after said severing for raising the member to draw the severed portion of the neck downwardly into and through said orifice to be reheated within the member.

10. Means for delivering molten glass to an open bottom suction mold mounted for vertical reciprocation above a supply pool of molten glass and for lateral movement with respect thereto, said means comprising a refractory conduit member having its lower end constantly immersed in the glass and its upper end provided with an upwardly facing delivery orifice adapted to register with the open bottom of the mold, means permitting downward movement of said member with the mold to facilitate upward movement of the glass through the orifice under the influence of suction in the mold, means for holding the member in the lowered position during upward movement of the filled mold, means for severing the neck of glass between the discharge orifice and the mold, and means for thereafter raising the member to retract the severed stub of glass left above the orifice to a position therebelow and within the member, to reheat the stub.

11. In combination, an open bottom suction gathering mold, a vertically reciprocable cup having an upwardly facing delivery orifice for molten glass, means for moving the cup downwardly and for causing an upward flow of glass through the orifice to the mold during such downward movement, means for separating the mold and cup, means for shearing the charge of glass in the mold from the glass in the cup after said separation, and positive means rendered operative after shearing by the operation of the shearing means for raising the cup to move the glass therein relatively downwardly.

12. The combination with a suction gathering mold mounted for vertical reciprocations toward and from the surface of a supply pool of molten glass and for lateral movement with respect to a gathering position over said pool, of means effective to charge the mold without dipping the same into the surface of the pool, said means comprising a delivery member having an upwardly facing delivery orifice normally spaced above the surface of the pool and downwardly extending walls immersed in the glass, vertically movable supporting means for the member, means for urging the supporting means and the member upwardly to said normal position, means for holding the supporting means and the member in a lowered position, shearing means and means actuated by said shearing means for releasing the holding means to permit upward movement of the supporting means and the member after shearing.

13. In combination, a machine including a mold for gathering charges of glass by suction from a pool of molten glass, shears, and shear actuating means for severing the connecting body of glass between the filled mold and the pool, a conduit member having its lower end immersed in the glass and an upwardly facing delivery orifice with which the mold registers when in gathering position, means for lowering the mold and the member, means for holding the member in the lowered position and for raising the mold to attenuate the connecting body of glass, and means actuated by the shear actuating means for releasing said holding means and for raising the member to withdraw the sheared stub within the member to reheat the same.

14. In combination, a machine including a mold for gathering charges of glass by suction from a pool of molten glass, shears for severing the connecting body of glass between the filled mold and the pool, a conduit member having its lower end immersed in the glass and an upwardly facing delivery orifice with which the mold registers when in gathering position, means for lowering the mold and the member, means constantly tending to raise the member, latching means for holding the member in the lowered position, and means actuated immediately after the shearing action of said shears for releasing said latching means, whereby said member is raised and the sheared stub is retracted and reheated.

15. In combination, a machine including a mold for gathering charges of glass by suction from a pool of molten glass, shears for severing the connecting body of glass between the filled mold and the pool, a conduit member having its lower end immersed in the glass and an upwardly facing delivery orifice with which the mold registers when in gathering position, means for lowering the mold and the member, means constantly tending to raise the member, latching means for holding the member in the lowered position, and means actuated by said shears for releasing said latching means, whereby said member is raised and the sheared stub retracted and reheated.

16. In combination, a machine including a mold for gathering charges of glass by suction from a pool of molten glass, shears for severing the connecting body of glass between the filled mold and the pool, a conduit member having its lower end immersed in the glass and an upwardly facing delivery orifice with which the mold registers when in gathering position, means for lowering the mold and the member, spring means constantly urging the member to a raised position, a spring-pressed latch adapted to hold the member in the lowered position against the force of said spring means, a connection between said shears and said latch to move the latter to a release position, whereby said member is raised upon completion of the shearing action and the sheared stub is retracted and reheated.

17. Means for delivering charges of glass from a pool of molten glass to a vertically reciprocable suction gathering mold, comprising a delivery member having its lower end immersed in the pool of glass and having an upwardly facing delivery orifice, means for supporting the member, means urging the supporting means to a raised position with said orifice above the surface of the pool, means for lowering the member in contact with the mold for filling the latter, means engaging the supporting means for holding the same in the lowered position during upward movement of the mold, shears, and means actuated by closing movement of the shears for releasing the engaging means from the supporting means, whereby said member is raised and the sheared stub in the orifice is retracted and reheated.

18. Means for delivering charges of glass from a pool of molten glass to a vertically reciprocable suction gathering mold, comprising a refractory cup having its lower end immersed in the pool of glass and having an upwardly facing discharge orifice, vertically movable rods and a bracket carried thereby for supporting the cup, coil compression springs surrounding said rods and urging the same to a raised position with said orifice above the surface of the pool, means for lowering the cup in contact with the mold for filling the latter, means for engaging and holding the rods in the lowered position during upward movement of the mold, shears, and means actuated by closing movement of the shears for releasing the engaging and holding means, whereby said springs raise said rods and the cup carried thereby to said raised position, to retract and reheat the sheared stub.

19. A forehearth having a gathering pool at its forward end, a pair of vertically slidable, upwardly spring-pressed rods on opposite sides thereof, a bracket carried by the rods, a refractory delivery cup supported by the bracket with its lower end in the pool and having an upwardly facing delivery orifice, a movable member mounted on the forehearth and having a free end resiliently urged to a position engaging one of said rods to hold the same in a lowered position, a shear assembly, and an arm carried by the assembly and movable with the shears for engaging the member to move the free end thereof out of engagement with said rod to release the same, whereby the rods, the bracket and the cup are raised to an upper position.

20. A forehearth having a gathering pool, a pair of vertically slidable rods mounted on the forehearth, a bracket carried by the rods, a refractory delivery cup supported by the bracket with its lower end in the pool and having an upwardly facing delivery orifice, spring means for urging the rods from a lowered position, upwardly to a position where said orifice is above the surface of the pool, means for lowering the rods and the cup against the force of said spring means, a pair of pivoted arms mounted on the forehearth having free ends resiliently urged to a position engaging said rods to hold the same in the lowered position, a shear assembly, and abutment elements carried by the shear assembly and movable with the shears for engaging the pivoted arms to swing the ends thereof away from the rods to release the latter, whereby said spring means lift the cup to the raised position.

FREDERICK WILLIAM DUHAN.